(No Model.)
G. F. EBERHARD.
HARNESS TRIMMING.
No. 334,007. Patented Jan. 12, 1886.
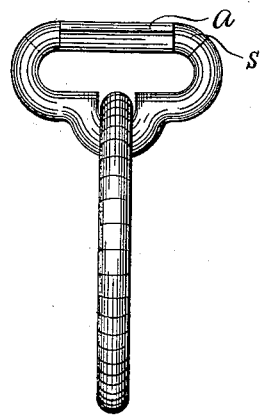
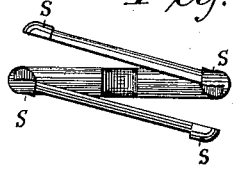
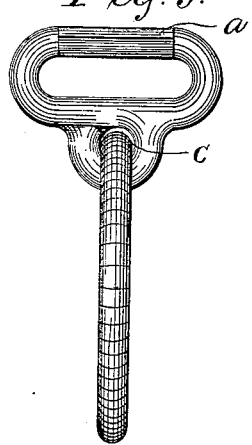
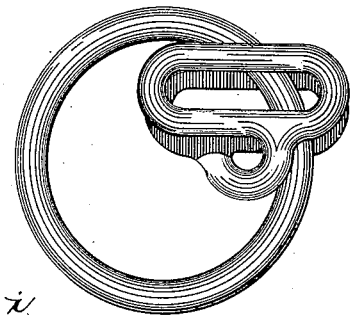
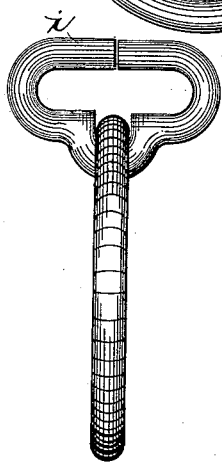
WITNESSES
Geo. F. Robinson
W. H. Beebe
INVENTOR
George F. Eberhard
By his Attorney
Bradford Howland

UNITED STATES PATENT OFFICE.

GEORGE F. EBERHARD, OF CLEVELAND, OHIO.

HARNESS-TRIMMING.

SPECIFICATION forming part of Letters Patent No. 334,007, dated January 12, 1886.

Application filed March 30, 1885. Serial No. 160,538. (No model.)

*To all whom it may concern:*

Be it known that I, GEORGE F. EBERHARD, a citizen of the United States, residing at the city of Cleveland, in the county of Cuyahoga and State of Ohio, have invented a new and useful Improvement in Harness-Findings, of which the following is a specification.

My invention consists of a halter loop and ring, which may be cast separately and then connected, as hereinafter shown and described.

In the drawings forming a part of this specification, Figure 1 represents the loop and ring connected with the ferrule $a$ around the split part of the loop, and Fig. 2 is a view of the top of the loop with the ferrule removed and the ends of the split part of the loop spread apart to admit the ring. The split part of the loop is reduced to receive ferrule $a$, which does not extend the whole length of the split, but leaves a shoulder, $s$, near each end thereof, to prevent the ends being drawn out of the ferrule.

Figs. 3 and 4 are similar views to Figs. 1 and 2, respectively, showing a modification of the loop, which is formed with an eye, $c$, to receive the ring, and the split ends are covered by ferrule $a$.

Fig. 5 represents another modification of the loop, which is severed at or near the center of its upper part, $i$, where the throat-piece of the halter is to be attached.

I claim as my invention—

1. A halter loop and ring formed with the upper part of the loop split and reduced, as shown, having shoulders at the ends of the reduced portion, and a ferrule on the reduced part, substantially as described.

2. A halter loop and ring having the loop formed with an eye, and with the upper part of the loop split down into the eye to admit the ring into the latter, substantially as described.

GEO. F. EBERHARD.

Witnesses:
W. P. CHASE,
T. R. BECKWITH.